United States Patent
Iwamoto et al.

(10) Patent No.: US 6,773,634 B2
(45) Date of Patent: Aug. 10, 2004

(54) CONDUCTIVE POLYMER COMPOSITION AND PTC ELEMENT

(75) Inventors: Yasumasa Iwamoto, Ichihara (JP); Tadatoshi Aridomi, Ichihara (JP); Yoichi Okubo, Ichihara (JP)

(73) Assignee: UBE Industries, Ltd., Yamaguchi (JP)

( * ) Notice: Subject to any disclaimer, the term of this patent is extended or adjusted under 35 U.S.C. 154(b) by 109 days.

(21) Appl. No.: 10/169,252

(22) PCT Filed: Jan. 31, 2001

(86) PCT No.: PCT/JP01/00666
§ 371 (c)(1),
(2), (4) Date: Jun. 28, 2002

(87) PCT Pub. No.: WO01/57889
PCT Pub. Date: Aug. 9, 2001

(65) Prior Publication Data
US 2003/0015285 A1 Jan. 23, 2003

(30) Foreign Application Priority Data
Feb. 1, 2000 (JP) .................... 2000-023942

(51) Int. Cl.⁷ .......................... H01B 1/24
(52) U.S. Cl. ................... 252/511; 338/22 R
(58) Field of Search .......... 252/511; 338/22 R, 338/22 SD

(56) References Cited

U.S. PATENT DOCUMENTS

| | | | |
|---|---|---|---|
| 3,760,495 A | * | 9/1973 | Meyer .................. 29/610.1 |
| 4,304,987 A | | 12/1981 | van Konynenburg |
| 4,980,541 A | | 12/1990 | Shafe et al. |
| 5,093,036 A | | 3/1992 | Shafe et al. |
| 5,164,133 A | * | 11/1992 | Ishida et al. .............. 264/105 |
| 5,181,006 A | | 1/1993 | Shafe et al. |
| 5,837,164 A | | 11/1998 | Zhao |
| 5,985,182 A | | 11/1999 | Zhao |
| 6,074,576 A | | 6/2000 | Zhao et al. |
| 6,090,313 A | | 7/2000 | Zhao |
| 6,254,244 B1 | * | 7/2001 | Ukai et al. .............. 362/31 |
| 6,396,384 B1 | * | 5/2002 | Blok et al. .............. 338/22 R |

FOREIGN PATENT DOCUMENTS

| | | | |
|---|---|---|---|
| JP | 63221601 | * | 9/1988 |
| JP | 1-186783 | | 7/1989 |
| JP | 01304704 | * | 12/1989 |
| JP | A 5-3103 | | 1/1993 |
| JP | 9-268208 | | 10/1997 |
| JP | 10-208902 | | 8/1998 |
| JP | A 11-5915 | | 1/1999 |
| JP | A 11-214203 | | 8/1999 |
| JP | A 2000-21605 | | 1/2000 |
| JP | 2003045704 | * | 2/2003 |

OTHER PUBLICATIONS

T. Takamatsu et al., "Polymorph and Phase–Transitional Phenomena in 1,4–trans–Polybutadiene Crystals," Polymer Preprints, Japan, vol. 49, 2000, pp. 2053–2054, with English abstract.
Jiyun Feng et al., "Positive and Negative Temperature Coefficient Effects of an Alternating Copolymer of Tetrafluoroethylene–Ethylene Containing Carbon Black–Filled HDPE Particles," pp. 7279–7282.
Jiyun Feng et al., "Carbon Black–Filled Immiscible Blends of Poly(Vinylidene Fluoride) and High Density Polyethylene: The Relationship Between Morphology and Positive and Negative Temperature Coefficient Effects," Polymer Engineering and Science, vol. 39, 1999, pp. 1209–1215.
J. Brandrup et al., "Polymer Handbook," 3rd edition, 1989, p. V/1.

* cited by examiner

Primary Examiner—Mark Kopec
(74) Attorney, Agent, or Firm—Young & Thompson

(57) ABSTRACT

A conductive polymer composition comprising 100 parts by weight of a crystalline polymer (A) and 5 to 150 parts by weight of a conductive powder (B) dispersed in the crystalline polymer (A) is disclosed. The crystalline polymer (A) shows crystal transition, thereby the conductive polymer composition exhibits PTC characteristics.

6 Claims, 3 Drawing Sheets

CONDUCTIVE POLYMER COMPOSITION AND PTC ELEMENT

TECHNICAL FIELD

The present invention relates to a novel conductive polymer composition having positive temperature coefficient (PTC) characteristics and a PTC element using the composition.

BACKGROUND ART

A PTC element comprising a conductive polymer which exhibits low resistivity at ambient (room) temperature and increases its resistance with increasing temperature (has a positive temperature coefficient of electrical resistance) is used as a protective element against overcurrent in batteries, electronic devices, etc. in case of abnormality.

Conventional conductive polymers for PTC elements include a composition comprising a mixture of polyethylene having a melting point of 100° C. or higher and a copolymer having a melting point of lower than 100° C. and a metal boride disclosed in JP-A-2000-21605 and compositions comprising a crystalline polymer such as high-density polyethylene and a conducive filler such as carbon black disclosed, e.g., in JP-A-11-214203 and JP-A-11-5915.

U.S. Pat. Nos. 5,837,164, 5,985,182, 6,074,576, and 6,090,313 (corresponding to JP-A-10-116703, JP-A-11-329076, and JP-A-2000-188206) disclose compositions comprising a semi-crystalline polymer containing nylon 11 and a carbon-based particulate conductive filler, describing that the compositions are characterized by exhibiting at least $10^3$ times as much electrical specific resistance at a switching temperature ranging from 140 to 200° C. as that at 25° C.

JP-A-5-3103 discloses a radiation-crosslinked conductive polymer composition, etc.

U.S. Pat. No. 4,980,541 (corresponding to JP-T-4-500745 and JP-A-11-144907) discloses a conductive polymer composition (i) which exhibits PTC behavior, (ii) which has a resistivity $R_{cp}$ of 0.01 to 100 Ω·cm at 20° C., and (iii) and which comprises (a) an organic polymer having a crystallinity of at least 5% and a melting point $T_m$ and (b) carbon black having a pH of less than 4.0, reciting olefin polymers or copolymers such as polyethylene, fluorine-containing polymers, and the like as examples of the organic polymer (a). The U.S. Patent mentions that use of carbon black having a pH of 4.0 or higher results in impairment of stability of the composition after high temperature aging.

U.S. Pat. Nos. 5,181,006 and 5,093,036 (corresponding to JP-T-4-500694) discloses a polymer thick film ink comprising (1) an organic polymer having a crystallinity of at least 5%, (2) an active solvent suitable for dissolving the polymer at room temperature, and (3) carbon black having a pH of less than 4.0. The recited organic polymer (1) includes polymers comprising at least one olefin; copolymers comprising at least one olefin and at least one monomer copolymerizable therewith, e.g., ethylene/acrylic acid, ethylene/ethyl acrylate, and ethylene/vinyl acetate; polyalkenamers such as polyoctenamer; melt-shapeable fluoropolymers, such as polyvinylidene fluoride and copolymers thereof; and blends of two or more such crystalline polymers.

U.S. Pat. No. 4,304,987 discloses a composition having PTC characteristics which comprises a crystalline polymer and carbon black, reciting olefin polymers or copolymers such as polyethylene and fluorine-containing polymers as the crystalline polymer. The U.S. Patent teaches that the composition is preferably crosslinked by irradiation or heating. As an embodiment of the PTC characteristics of the composition, the resistivity reaches the maximum at around 130° C. and decreases in a higher temperature range.

The following reports suggest the factors by which these conventional polymer compositions exhibit PTC characteristics. *Polymer*, vol. 41, p. 7279 (2000) reports that the strong PTC effect of carbon black-loaded crystalline polymer compositions is attributed to an increase of average distance among carbon black particles which accompanies thermal expansion of melting polymer crystals. In *Polymer Engineering and Science*, vol. 39, p. 1207, (Jul., 1999), it is reported that transition from low-resistant state to high-resistant state is caused by volumetric expansion of melting polymer crystals.

In short, melting of crystalline polymers is a factor of PTC characteristics. Therefore, in application to PTC elements, the conventional polymer compositions require such steps as crosslinking in order to retain the shape of the element.

It is said that the conventional polymer compositions manifest their PTC characteristics through the following mechanism. At temperatures lower than the crystal melting point of a polymeric component of the composition, conductive particles dispersed in the noncrystalline region of the polymeric component are in contact with each other to form a route for electric conduction to show low resistance. With a rise in temperature, the crystalline region of the polymeric component melts to increase the volume of the noncrystalline region. As a result, the distance among the conductive particles increases to cut the conduction route thereby showing high resistance. On cooling down to ambient temperature, the volume of the noncrystalline region of the polymeric component reduces to bring the conductive particles closer to each other to re-form the conduction route thereby exhibiting low resistance.

In this way the conventional polymer compositions rely on melting of crystalline polymers for the PTC behavior. Therefore, in order for the conventional polymer compositions to be applied to PTC elements, they need a special process for flow prevention, such as irradiation crosslinking, so as to retain the shape of the element. Further, because the above-described polymers are slow in melting, which can result in retarded PTC behavior, sharper behavior has been desired.

Furthermore, PTC elements in some applications are required to work at lower temperatures than conventional switching temperatures, and improvement in this respect has been demanded.

Besides, PTC elements comprising some conventional polymer compositions have poor stability to repetition, and improvement in this point has also been required.

In addition, some conventional polymer compositions can exhibit negative temperature coefficient (NTC) characteristics in temperatures higher than the temperature at which resistance steeply rises because of the PTC characteristics. Because the temperature showing the NTC characteristics is close to that showing the PTC characteristics, improvement has been desired.

It is known that trans-1,4-polybutadiene has crystal polymorphism and shows phase transition at around 50 to 80° C. That is, it is said that the crystal form in a low-temperature phase is a monoclinic phase, which changes to a pseudohexagonal crystal form at a high temperature (see, for example, *Polymer Preprints, Japan*, vol. 49, No. 8 (2000)).

*Polymer Handbook* (3rd ed.) teaches that trans-polybutadiene exhibits crystalline modifications I and II having a density of 0.97 gcm$^{-3}$ and 0.93 gcm$^{-3}$, respectively, and transition from modification I to modification II occurs at 75° C.

Accordingly, an object of the present invention is to provide a conductive polymer composition which exhibits PTC behavior at relatively low temperature, shows sharp PTC behavior with stability to repetition, does not flow with temperature elevation and therefore needs no processing step for retaining the shape of a PTC element, and has a wide temperature latitude for producing high resistance.

DISCLOSURE OF THE INVENTION

The present invention accomplishes the above object by providing a conductive polymer composition exhibiting PTC characteristics and comprising 100 parts by weight of a crystalline polymer (A) and 5 to 150 parts by weight of a conductive powder (B) dispersed in the crystalline polymer (A), which is characterized in that the crystalline polymer (A) shows crystal transition.

The present invention provides the above-described conductive polymer composition characterized in that the crystalline polymer (A) increases in volume due to crystal transition thereby imparting PTC characteristics to the composition.

The present invention also provides the above-described conductive polymer composition characterized in that the crystalline polymer (A) is trans-1,4-polybutadiene having a trans-1,4-bond content of 85% or more The present invention also provides the above-described conductive polymer composition characterized in that the conductive powder (B) is carbon black.

The present invention also provides the above-described conductive polymer composition characterized in that the carbon black has a pH of 6 or higher.

The present invention also provides a PTC element characterized by using the above-described conductive polymer composition.

BRIEF DESCRIPTIONS OF THE DRAWINGS

BEST MODE FOR CARRYING OUT THE INVENTION

Figure 1:
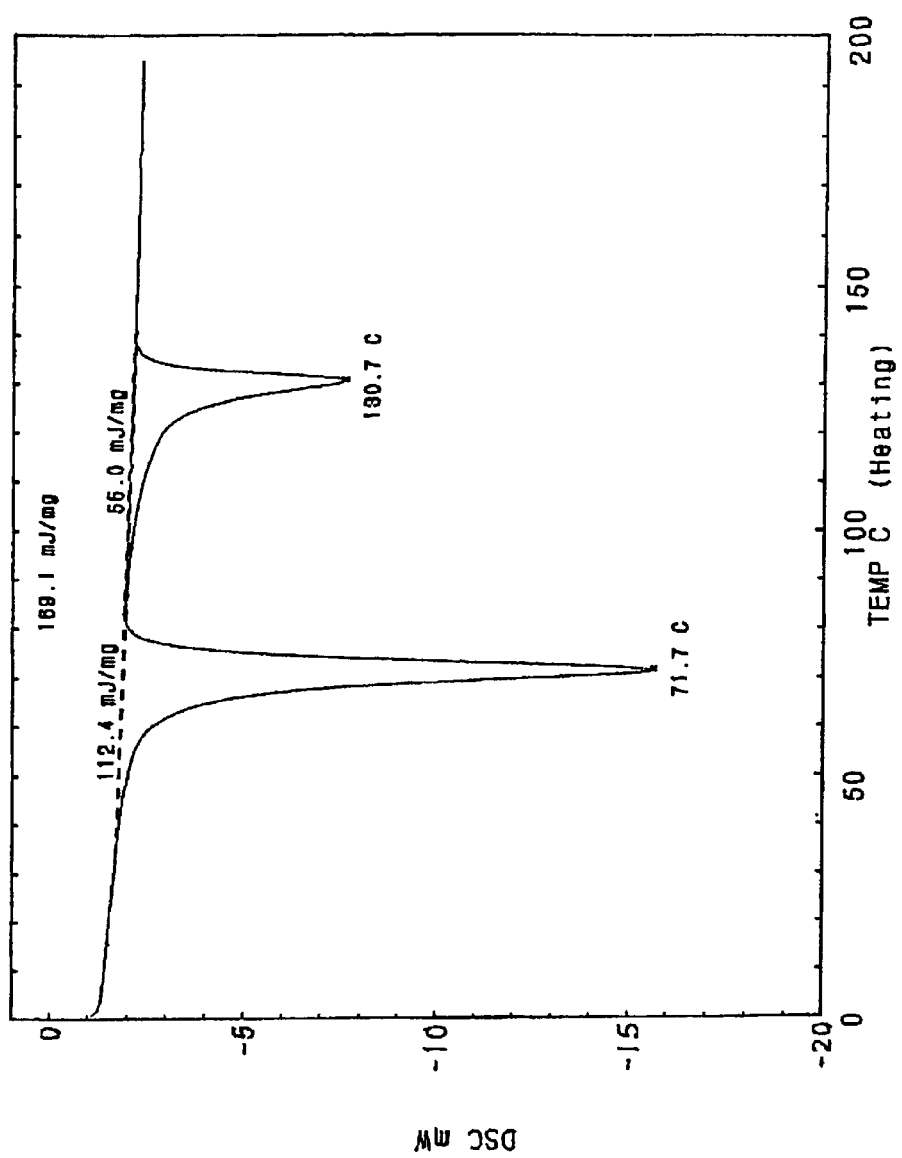
FIG. 1 is a DSC chart of the trans-1,4-polybutadiene prepared in Reference Example 1.

The crystalline polymer (A) which can be used in the present invention is a polymer showing crystal transition. It is preferred for this polymer to increase in volume through crystal transition in a solid state. It is preferred that the increase in volume through crystal transition be steep.

The crystalline polymer preferably has a crystallinity of 5% or more, particularly 10 to 60%. Methods of measuring crystallinity include X-ray diffractometry, density method, and differential thermal analysis. For example, a crystallinity χ measured by differential thermal analysis is represented by the ratio of heat of fusion of a sample to heat of fusion of a standard sample having a crystallinity of 100% ($\chi = \Delta H / \Delta H_0$).

The crystalline polymer has a low-temperature stable crystal form and a high-temperature stable crystal form and undergoes crystal transition at a transition temperature. The crystal transition is accompanied with a volume change, which can be seen from a dramatic rise of a linear expansion coefficient in the vicinity of the crystal transition point (see FIG. 2).

The crystalline polymer that can be used suitably includes crystalline trans-diene polymers showing crystal transition, such as trans-1,4-polybutadiene, trans-1,4-polyisoprene, and trans-2,3-dichlorobutadiene, with trans-1,4-polybutadiene being particularly preferred. Trans-1,4-polybutadiene shows phase transition at around 50 to 80° C.

The mechanism of PTC characteristics manifestation of PTC elements using the conductive polymer composition of the invention does not rely on polymer's melting as in those using the conventional conductive polymers but on the crystal transition of the crystalline polymer.

It is generally advisable that the trans-1,4-polybutadiene used as a crystalline polymer has a trans-1,4-bond content of 85% or more, particularly 90% or more, especially 99% or more, as calculated from IR, $^1$H-NMR, $^{13}$C-NMR or like spectra. A lower trans-1,4-bond content results in reduced polymer regularity, leading to a reduced crystallinity.

The weight average molecular weight of the trans-1,4-polybutadiene is preferably, but not limited to, 10,000 to 120,000. Greater weight average molecular weights can reduce the crystallinity or make processing difficult. Smaller weight average molecular weights can result in poor strength or toughness. The term "weight average molecular weight" as referred to herein is one obtained by gel-permeation chromatography (GPC) using styrene as standards and o-dichlorobenzene as a solvent.

The trans-1,4-polybutadiene preferably has a molecular weight distribution, i.e., the ratio of weight average molecular weight (Mw) to number average molecular weight (Mn), Mw/Mn, of 3 or less.

The trans-1,4-polybutadiene preferably has a melting point of 120 to 145° C.

The trans-1,4-polybutadiene exhibits crystal transition from a low-temperature crystal structure to a high-temperature crystal structure, which is observable as heat absorbtion accompanying crystal transition in the measurement with a differential scanning calorimeter (DSC). The crystal transition temperature, which ranges from 50 to 80° C., can be varied with variations in molecular weight, microstructure, and the like. The trans-1,4-polybutadiene has a high transition rate between the two crystal structures and therefore exhibits excellent PTC characteristics when formulated as a conductive polymer composition. The heat absorbtion accompanying phase transition is preferably 50 to 250 J/g, still preferably 80 to 200 J/g.

The crystallinity of the trans-1,4-polybutadiene, which can be evaluated from heat absorbtion at the melting point in DSC measurement, is preferably 5% or more.

The melting point and crystal transition point of the trans-1,4-polybutadiene can be measured with a differential scanning calorimeter (DSC) as follows. In a nitrogen atmosphere, a sample is heated at a constant rate to once melt completely at 200° C., then cooled at a constant rate to 30° C. to recrystallize, and again heated up to 200° C. The differential calories are measured in the second temperature rise, and the peak temperatures corresponding to the melting and the crystal transition are taken as the melting point and the crystal transition point, respectively.

The trans-1,4-polybutadiene can have improved stability and a prolonged life by addition of antioxidants, photo stabilizers, thermal stabilizers, flame retardants, and the like, which include amine-ketone types, aromatic secondary amine types, monophenol types, bisphenol types, polyphenol types, benzimidazole types, dithiocarbamic acid types, thiourea types, phosphorous acid types, organic thio acid types, special wax types, and mixed systems comprising two or more of these types. The antioxidants include, for example, tris(nonylphenyl) phosphite and 2,6-di-t-butyl-4-methylphenol.

The trans-1,4-polybutadiene can further contain 0.01 to 6% by weight of nucleating agents, such as organic ones, inorganic ones, and high-melting point polymeric ones.

As far as the characteristics of the present invention are not adversely affected, other polymers, crystalline polymers or amorphous polymers may be added to the trans-1,4-polybutadiene.

The trans-1,4-polybutadiene can be prepared by known polymerization methods.

Catalysts based on vanadium, titanium, nickel, cobalt, barium, lithium or the like can be used. Preferred of them are vanadium- or titanium-based catalysts. Vanadium catalysts include triacetylacetonatovanadium, vanadium trichloride-THF complex, vanadium oxytrichloride, and vanadium naphthenate. Cocatalysts which can be used in the catalyst systems include organometallic compounds, organometallic halides, and organometallic hydrides of the metals belonging to the groups I to III of the Periodic Table and an alumoxane. Inter alia, organometallic halides, specifically chlorinated organoaluminum compounds such as ethylaluminum sesquichloride (EASC) and diethylaluminum chloride (DEAC), are preferably used. These catalysts or cocatalysts may be used either individually or as a mixture thereof.

Of the above-mentioned catalysts and cocatalysts, a combination of triacetylacetonatovanadium, ethylaluminum sesquichloride (EASC), and diethylaluminum chloride (DEAC) is used suitably.

Polymerization methods which can be adopted include solution polymerization using a solvent, gas-phase polymerization using a supported catalyst, and bulk polymerization using a butadiene monomer as a medium.

Solvents which can be used in solution polymerization include aliphatic hydrocarbons, such as pentane, hexane, heptane, and cyclohexane; aromatic hydrocarbons, such as benzene, toluene, and xylene; halogenated hydrocarbons, such as chloroform, methylene chloride, dichloroethane, and chlorobenzene; and mineral oil.

In each of the polymerization methods, polymerization is usually carried out at a temperature of −20 to 100° C., preferably −10 to 70° C., for a period of 1 minute to 12 hours, preferably 5 minutes to 2 hours.

While butadiene can be polymerized in the presence of the above-described catalyst system, it is possible to copolymerize butadiene with a small amount of an olefin of different kind, a conjugated diene or a non-conjugated diene as long as such does not impair the polymer physical properties. The olefin includes ethylene, propylene, butene-1,4-methylpentene-1, hexene-1, octene-1, norbornene, cyclopentene, and trimethylvinylsilane. The conjugated diene includes isoprene, 2,3-dimethylbutadiene, 1,3-pentadiene, 2-methyl-1,3-pentadiene, 4-methyl-1,3-pentadiene, and 2,4-hexadiene. The non-conjugated diene includes dicyclopentadiene, 5-ethylidene-2-norbornene, and 1,5-hexadiene.

The conductive powder (B) used in the present invention includes graphite, carbon black, carbon fiber, carbon whisker, conductive metal powder, and inorganic compounds coated with a thin film of carbon or metal. Carbon black is especially preferred of them.

Carbon blacks which can be used include commercially available acetylene black (e.g., Denka Black from Denki Kagaku Kogyo K.K.) and Ketjen black (available from Mitsubishi Chemical Corp.). It is preferred for the carbon blacks to be fine with a small particle size, to have a high structure, and to have a high degree of graphitization. Carbon blacks of various shapes and properties can be used. For example, carbon black having a pH of 6 to 10 is preferably used.

The conductive metal powder includes metals, e.g., nickel (Ni), silver (Ag), copper (Cu), titanium (Ti), iron (Fe), tungsten (W), and tin (Sn), and alloys thereof. These powders can be used either individually or as a mixture thereof.

A mixture of the above-described carbon black and conductive metal powder can be used as a conductive powder. In this case, the carbon black and the conductive metal powder are preferably used at a weight ratio of 0.1 to 20:1.

The conductive polymer composition of the present invention comprises 100 parts by weight of the crystalline polymer (A) and 5 to 150 parts by weight, preferably 5 to 70 parts by weight, of the conductive powder (B). If the proportion of the conductive powder (B) is less than 5 parts by weight, the conductivity at room temperature would be insufficient. If it exceeds 150 parts by weight, the conductive powder is difficult to disperse in the polymer, which results in reduction of mechanical strength of the composition.

The components are mixed by methods commonly employed for compounding a resin composition by kneading. Useful kneading machines include a Brabender, a single-screw extruder, a twin-screw extruder, a Banbury mixer, a heat roll, a kneader, a mixing roll, a three-roll, and a planetary mixer.

The conductive polymer composition of the present invention which is obtained by kneading the above-recited components can be molded into an arbitrary shape, such as sheeting, molded parts, film, pipes, and tubing, by injection molding, blow molding, extrusion, and the like techniques. The conductive polymer composition of the present invention can also be molded into sheeting or film by dissolving the composition in a good solvent for the polymer to prepare an ink and applying the ink to a substrate by means of, for example, a doctor blade.

The PTC element according to the present invention comprises a conductive sheet, prepared by molding the conductive polymer composition of the invention into sheeting, having formed on each side thereof a metal plate electrode made of gold, silver, copper, aluminum, nickel, stainless steel, iron, an iron alloy, a copper alloy, etc. with or without an adhesive layer interposed therebetween. It is the same as conventional PTC elements, except that the conductive sheet is made of the conductive polymer composition of the present invention.

The conductive polymer composition of the present invention exhibits PTC behavior at relatively low temperatures (lower than 90° C.) and maintains excellent performance showing only a small increase of resistance after repeated operation (PTC behavior stability to repetition).

The term "PTC behavior" as used herein denotes the character of the conductive polymer composition such that there is at least one temperature $T_x$ at which the ratio of specific resistance $R_1$ at 25° C. to specific resistance $R_2$ at temperature $T_x$ satisfies relationship: $\log(R_2/R_1) \geq 1.5$, desirably $\log(R_2/R_1) \geq 4$. The conductive polymer composition of the invention has such a $T_x$ in a range above the phase transition temperature of the crystalline polymer and below the melting point of the crystalline polymer.

Where a trans-polybutadiene is used as a crystalline polymer, the conductive polymer composition of the invention exhibits a specific resistance of $10^{-1}$ to $10^4$ Ωcm in low temperature (0 to 60° C.) and of $10^3$ to $10^{10}$ Ωcm in high temperature (80 to 100° C.).

The conductive polymer composition of the invention is characterized by undergoing little change in resistance when used repeatedly as a PTC element.

The conductive polymer composition of the invention, when used as a PTC element, shows continuity of temperature $T_x$ over a width of 40 to 50° C. In other words, the PTC element has a latitude of temperature in which it exhibits high resistance.

The conductive polymer composition of the invention, when used as a PTC element, exhibits a steep PTC characteristic curve. In other words, the PTC element is characterized in that the rate of resistance increase is sensitive to temperature. For example, a low-to-high change in resistivity of the order of $10_3$ occurs with a temperature change within 15° C.

The conductive polymer composition of the present invention manifests PTC characteristics through crystal conversion, differing in terms of PTC characteristics manifestation mechanism from conventional crystalline polymer compositions which count on melting of the crystalline polymer. Hence, the conductive polymer composition of the invention exhibits PTC characteristics in a relatively lower temperature range than its melting point, in which range it is capable of retaining its shape. Accordingly, the conductive polymer composition of the invention does not require such a step as crosslinking for shape retention that has been needed for the conventional polyethylene compositions.

The PTC element comprising the conductive polymer composition of the invention is suited for use as circuit protective elements, temperature-sensing switches, and the like, more particularly for protection of transformers and motors from overheat, protection of ICs or LSIs from overheat and overcurrent, protection of battery packs from overheat and overcurrent, and protection of computers and peripheral equipment thereof from overheat and overcurrent.

In addition, the conductive polymer composition of the present invention undergoes only small deformation under pressure application in the vicinity of the switching temperature of the PTC characteristics as compared with the conventional ones and are therefore fit for a variety of applications.

In what follows, Reference Example for synthesis of the crystalline polymer used in the present invention and Examples of the present invention are presented, but the present invention should not be construed as being limited thereto.

In Reference Example, "trans-1,4-bond content" was calculated based on the IR spectrum obtained by KBr tablet method with a diffraction grating infrared spectrophotometer (FT-IR) JIR-5500 manufactured by JEOL Ltd. More specifically, the area of a peak in the vicinity of 966 cm$^{-1}$ that is assigned to trans-1,4-bonds, the area of a peak in the vicinity of 730 cm$^{-1}$ that is assigned to cis-1,4-bonds, and the area of a peak in the vicinity of 912 cm$^{-1}$ that is assigned to vinyl bonds are measured, and the peak area corresponding to trans-1,4-bonds is divided by the sum of these peak areas to give the content of trans-1,4-bonds.

The melting point and crystal transition point were measured as follows. A differential scanning calorimeter (DSC) SSC5200 supplied by Seiko Instruments Inc. was used. In a nitrogen atmosphere, a 10 mg sample sealed into an aluminum-made sample pan was heated from room temperature at a rate of 10° C./min up to 200° C., at which it was kept for 5 minutes to melt completely, then cooled at a rate of 10° C./min to 30° C., at which it was kept for 5 minutes to recrystallize, and reheated up to 200° C. at a rate of 10° C./min. The differential heat was measured in the second temperature rise. The temperatures of the peaks corresponding to melting and crystal transition were taken as melting point and crystal transition point, respectively.

REFERENCE EXAMPLE 1

Synthesis of Trans-1,4-polybutadiene

Into an autoclave thoroughly purged with nitrogen was put 37.5 l of toluene, and 12.5 l of butadiene was added. Then 250 mmol of vanadium oxytrichloride (VOCl$_3$) as a catalyst and 1250 mmol of diethylaluminum chloride (DEAC) as a cocatalyst were further added thereto to commence polymerization. Polymerization was conducted at −5° C. for 30 minutes in a nitrogen atmosphere. The polymerization solution was poured into ethanol of double volume for recovery to precipitate the polymer, which was collected, washed with ethanol, mixed with 3% by weight of an antioxidant Irganox 1075, and dried.

Figure 2:
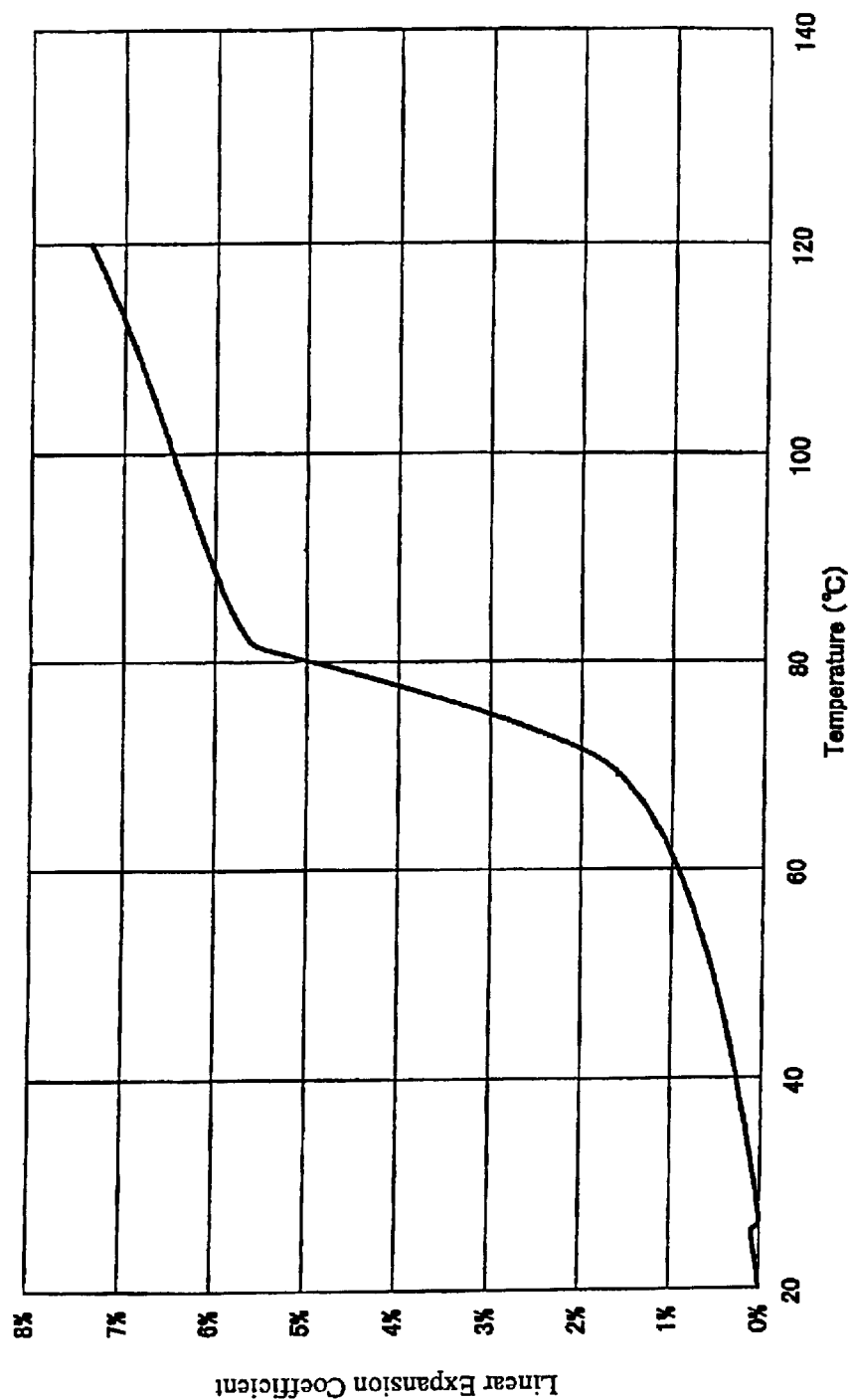
FIG. 2 is a TMA chart of the trans-1,4-polybutadiene prepared in Reference Example 1.

The resulting polybutadiene weighed 4.8 kg and had a weight average molecular weight of 112,000, a trans-1,4-bond content of 99%, a melting point of 131° C., and a crystal transition point of 72° C. The heat absorbed on crystal transition was 112 J/g, and that on melting was 55 J/g. Taking the theoretical value with a 100% crystallinity as 85 J/g, the crystallinity of the polybutadiene was 65%. The DSC chart of the polybutadiene is shown in FIG. 1. FIG. 2 shows the linear expansion coefficient (vs. temperature) of the polybutadiene measured by heating from room temperature up to 120° C. at a rate of 5° C./min with TMA-50 supplied by Shimadzu Corp. As is apparent from FIG. 2, the linear expansion coefficient of the polybutadiene abruptly increases in the vicinity of the crystal transition point, proving that the polybutadiene increases its volume around the crystal transition point.

EXAMPLE 1

Figure 3:
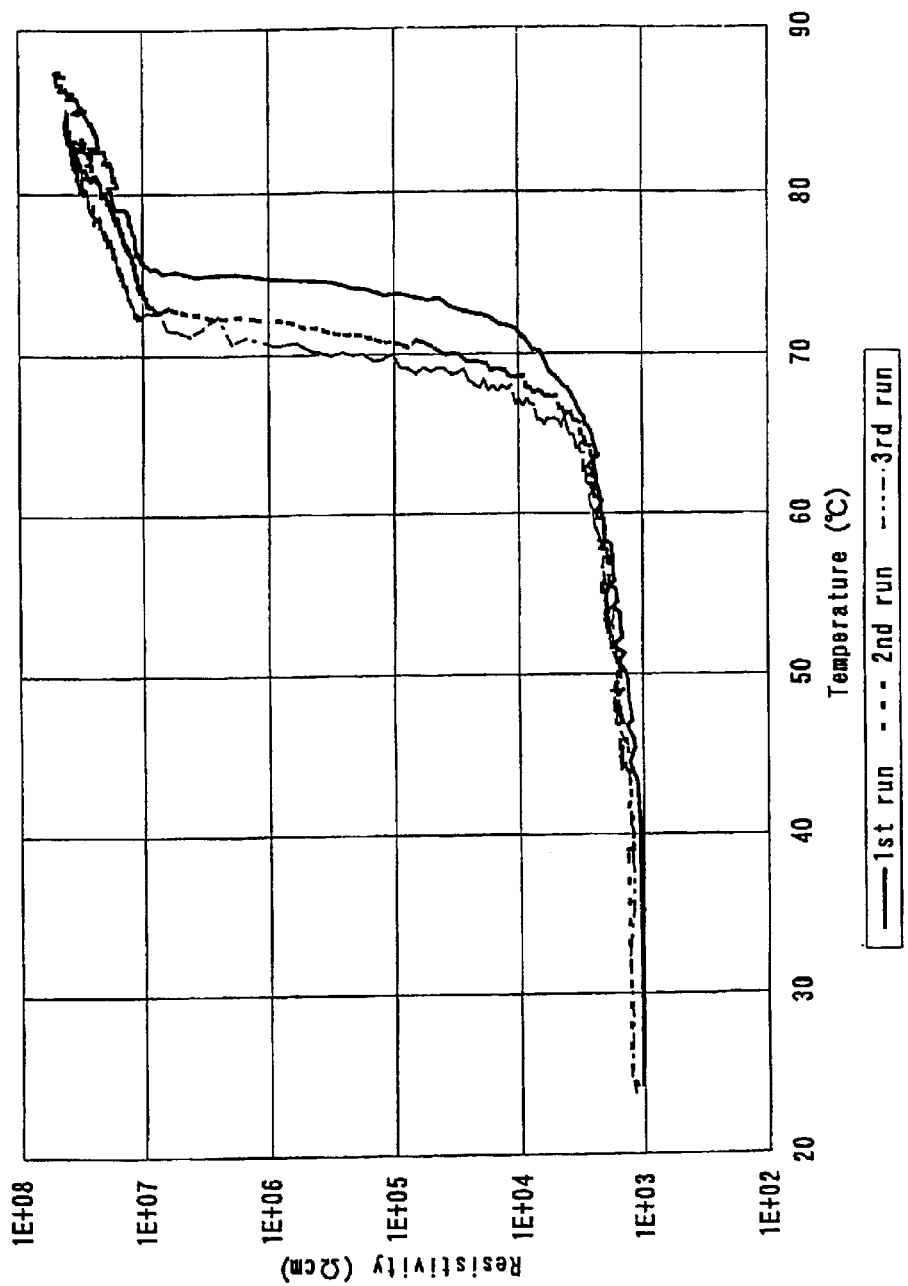
FIG. 3 is a chart showing the PTC behavior of the PTC element prepared in Example 1.

A hundred parts by weight of the trans-1,4-polybutadiene prepared in Reference Example 1, 16 parts by weight of acetylene black (FX-35), and 5 parts by weight of copper powder were mixed in a Brabender and molded into sheeting to obtain a conductive sheet having a thickness of 1 mm. Silver paste was applied to both sides of the conductive sheet to provide electrodes. The resulting PTC element exhibited PTC characteristics, having a specific resistance of $1.3 \times 10^4$ $\Omega$cm at 25° C. and $3.0 \times 10^8$ $\Omega$cm at 85° C., which gave a $\log(R_2/R_1)$ of 4.4. As is apparent from FIG. 3, when the PTC element was run three times between room temperature and 85° C., it exhibited low resistance at room temperature and high resistance at high temperature in a stable manner.

EXAMPLES 2 to 6

100 parts by weight of the trans-1,4-polybutadiene prepared in Reference Example 1 was added a prescribed amount of a conductive polymer as shown in Table 1 below and the mixture was kneaded in a Brabender at 190° C. for 15 minutes to prepare a conductive polymer composition. Each of the resulting compositions was molded into a 1 mm thick sheet, which was fabricated into a PTC element in the same manner as in Example 1. As is seen from Table 2 below, every PTC element exhibited PTC characteristics. The properties of the conductive powders used in Examples are shown in Table 3 below.

TABLE 1

| | Conductive Powder and Compounding Ratio | | | |
|---|---|---|---|---|
| Example No. | Name | Weight | Name | Weight |
| 2 | FX-35 | 14 | — | — |
| 3 | FX-35 | 14 | SN-100P | 1 |
| 4 | FX-35 | 16 | SN-100P | 1 |
| 5 | Ketjen black | 8 | — | — |
| 6 | FX-35 | 50 | — | — |

TABLE 2

| | Low-temperature Resistivity $R_0$ | | High-temperature Resistivity $R_2$ | | |
|---|---|---|---|---|---|
| Example No. | Measuring Temperature (° C.) | Specific Resistance ($\Omega$cm) | Measuring Temperature (° C.) | Specific Resistance ($\Omega$cm) | $\log(R_2/R_0)$ |
| 2 | r.t. | 3.7E+03 | 85 | 2.9E+05 | 1.9 |
| 3 | 15 | 1.2E+03 | 84 | 1.0E+06 | 2.9 |
| 4 | 15 | 7.0E+01 | 91 | 3.2E+04 | 2.7 |
| 5 | 25 | 5.9E+03 | 85 | 1.1E+09 | 5.3 |
| 6 | 25 | 2.1E+00 | 110 | 8.2E+00 | 1.6 |

TABLE 3

| Conductive Powder | Primary Particle Size (m$\mu$) | pH | Specific Surface Area (m$^2$/g) |
|---|---|---|---|
| FX-35[1] | 25 | 9–10 | 130 |
| Ketjen black[2] | 30 | 9.0 | 800 |
| SN-100P[3] | 0.01–0.03 | 2.5–3.5 | 60–70 |

[1] Denka Black (carbon black available from Denki Kagaku Kogyo K.K.)
[2] Ketjen black EC (carbon black available from Mitsubishi Chemical Corp.)
[3] Transparent conductive material (tin oxide powder) available from Ishihara Sangyo Kaisha, Ltd.

INDUSTRIAL APPLICABILITY

The conductive polymer composition according to the present invention exhibits PTC behavior in relatively low temperature, shows sharp PTC behavior with stability to repetition, does not flow with temperature elevation and therefore needs no processing step for retaining the shape of a PTC element, and has a wide temperature latitude for producing high resistivity, and is therefore useful as a PTC element material.

What is claimed is:

1. A conductive polymer composition exhibiting PTC characteristics and comprising 100 parts by weight of a crystalline polymer (A) and 5 to 150 parts by weight of a conductive powder (B) dispersed in said crystalline polymer (A), which is characterized in that said crystalline polymer (A) is trans-1,4-polybutadiene having a trans-1,4-bond content of 99% or more which shows crystal transition and said crystalline polymer (A) increases in volume through crystal transition thereby imparting PTC characteristics to said conductive polymer composition.

2. The conductive polymer composition according to claim 1, characterized in that said conductive powder (B) is carbon black.

3. The conductive polymer composition according to claim 2, characterized in that said carbon black has a pH of 6 or higher.

4. The PTC element characterized by using a conductive polymer composition according to claim 3.

5. The PTC element characterized by using a conductive polymer composition according to claim 2.

6. The PTC element characterized by using a conductive polymer composition according to claim 1.

\* \* \* \* \*